No. 824,571. PATENTED JUNE 26, 1906.
J. R. McALISTER.
VEHICLE WHEEL.
APPLICATION FILED OCT. 10, 1905.

Witnesses
Frank Hough
F. S. Elmore

Inventor
J. R. McAlister.
By Victor J. Evans.
Attorney

UNITED STATES PATENT OFFICE.

JAMES R. McALISTER, OF HAILESBORO, NEW YORK.

VEHICLE-WHEEL.

No. 824,571.　　　　　Specification of Letters Patent.　　　Patented June 26, 1906.

Application filed October 10, 1905. Serial No. 282,178.

*To all whom it may concern:*

Be it known that I, JAMES R. MCALISTER, a citizen of the United States, residing at Hailesboro, in the county of St. Lawrence and State of New York, have invented new and useful Improvements in Vehicle-Wheels, of which the following is a specification.

This invention relates to vehicle-wheels, being especially directed to devices for connecting the ends of the spokes with the felly, and has for its objects to produce a comparatively simple inexpensive construction wherein the spokes will be firmly and securely engaged with the felly, one wherein the parts may be conveniently assembled, and one which obviates liability of the felly-sections splitting at their ends during the operation of shrinking the tire in place.

With these and other objects in view the invention consists of the novel features of construction and combination of parts more fully hereinafter set forth.

Figure 1:
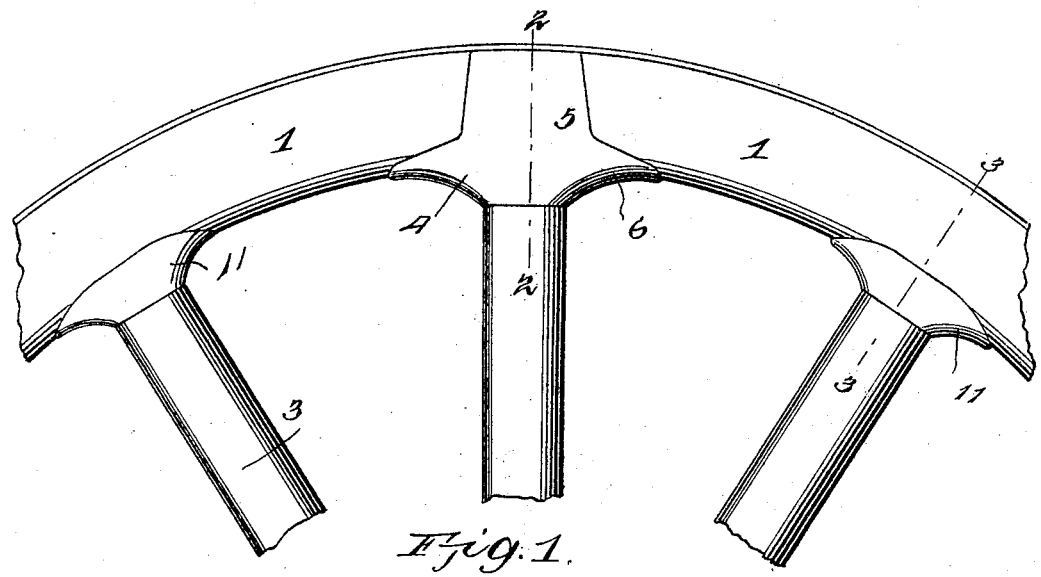
Figure 2:
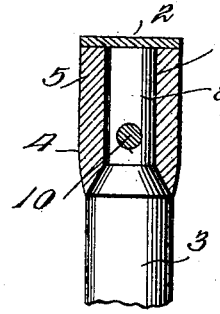
Figure 3:
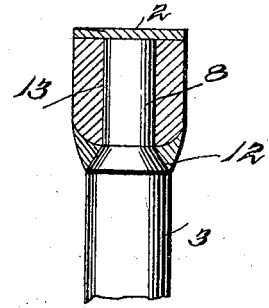
Figure 5:
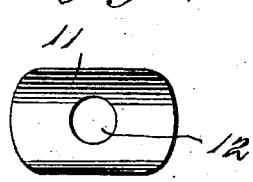
Figure 4:
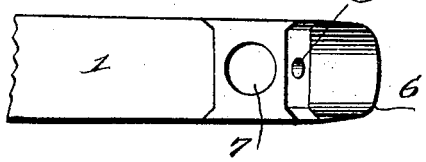

In the accompanying drawings, Figure 1 is a side elevation of a portion of a wheel, showing the spokes connected therewith in accordance with my invention. Fig. 2 is a detail section taken on the line 2 2 of Fig. 1. Fig. 3 is a similar view taken on the line 3 3 of Fig. 1. Fig. 4 is an edge view of a portion of the felly with the tire and one of the felly-sections removed. Fig. 5 is an inner face view of one of the auxiliary spoke-couplings.

Referring to the drawings, it will be seen that the wheel comprises a plurality of felly-sections 1, assembled to form a rim, having applied to its outer face a band-tire 2 and a plurality of spokes 3, engaged at their outer ends with the felly or rim, these parts, except as hereinafter explained, being of the usual or any appropriate construction and material and adapted to perform their ordinary functions.

For connecting the outer ends of the ninety-degree spokes with the rim I employ main coupling members 4, cast or otherwise formed in a single piece and comprising a wedge-shaped body portion 5, adapted to fit between the ends of the felly-sections 1 and projecting bearing portions or flanges 6, which bear on the inner faces of said sections and have inner curved or concaved faces shaped to conform to the inner faces of the felly, there being formed in the coupling 4 a central socket or seat 7, designed to receive the reduced portion or tenon 8, formed on the outer end of the spoke, while extending transversely through the body 5 and intersecting the socket 7 is an opening 9, adapted to receive a dowel-pin 10, engaged with the ends of the sections 1, as usual, this pin being also extended through the tenon 8 and serving the further function of fixing the latter in the coupling member 4. For connecting the ends of the remaining spokes with the rim or felly I employ auxiliary coupling members or plates 11, the inner faces of which are of concaved form to fit the adacent face of the felly, these clips being provided with central openings 12, through which the reduced portions or tenons 8 of the corresponding spokes are entered into suitable sockets or seats 13, formed in the felly.

In practice the wheel-rim is composed of four of the sections 1, as usual, there being disposed between the ends of the sections coupling members 4 of the construction above described, it being noted that owing to the coupling members each having a wedge-shaped body portion 5 said members will when entered between the sections exert endwise pressure thereon for fixing the sections securely in place. After the rim and spokes have been assembled the tire 2 is applied and shrunken in place, as usual, it being noted that the pressure exerted upon the felly-sections during the operation of shrinking the tire serves to maintain them in secure coupled engagement with the coupling members 4. It is to be noted that under this construction the necessity for socketing the ends of the felly-sections to receive the tenons 8 of the ninety-degree spokes is obviated and that consequently the liability of the felly-sections splitting during the operation of applying the tire is overcome.

From the foregoing it is apparent that I produce a simple device admirably adapted for the attainment of the ends in view, it being understood that minor changes in the details herein set forth may be resorted to without departing from the spirit of the invention.

Having thus fully described my invention, what I claim as new is—

In a wheel, a rim comprising a plurality of sections, a wedge-shaped coupling-block seated between the adjacent ends of the sections and having bearing portions designed to overlap the ends and bear on the inner face of the sections, said coupling being provided with a socket or seat and having an opening intersecting said seat, a spoke provided with a tenon fitted in the socket, and a dowel-pin entered through the opening and engaged with the ends of the rim-sections.

In testimony whereof I affix my signature in presence of two witnesses.

JAMES R. McALISTER

Witnesses:
 R. E. McLEAR,
 ARTHUR W. ORVIS